United States Patent
Chana et al.

(10) Patent No.: US 8,903,427 B2
(45) Date of Patent: *Dec. 2, 2014

(54) SYSTEM AND METHOD FOR LIMITING A WIRELESS COMMUNICATION DEVICE TO A SPECIFIED GEOGRAPHIC ZONE

(75) Inventors: Tejender Chana, Calgary (CA); Giuseppe Joe DiRienzo, Calgary (CA)

(73) Assignee: Novatel Wireless, Inc., San Diego, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 12/938,347

(22) Filed: Nov. 2, 2010

(65) Prior Publication Data

US 2011/0136513 A1  Jun. 9, 2011

Related U.S. Application Data

(63) Continuation of application No. 11/250,979, filed on Oct. 14, 2005, now Pat. No. 7,826,856.

(60) Provisional application No. 60/619,016, filed on Oct. 14, 2004.

(51) Int. Cl.
| | |
|---|---|
| *H04W 64/00* | (2009.01) |
| *H04M 3/42* | (2006.01) |
| *H04M 3/38* | (2006.01) |
| *H04L 29/06* | (2006.01) |
| *H04W 8/18* | (2009.01) |
| *H04W 12/08* | (2009.01) |
| *H04W 48/04* | (2009.01) |

(52) U.S. Cl.
CPC ............ *H04W 8/18* (2013.01); *H04M 3/42348* (2013.01); *H04M 3/38* (2013.01); *H04L 63/10* (2013.01); *H04W 12/08* (2013.01); *H04M 3/42153* (2013.01); *H04L 63/107* (2013.01); *H04W 48/04* (2013.01)

USPC .................. 455/456.4; 455/456.1; 455/456.5; 455/456.6; 455/411; 455/410

(58) Field of Classification Search
USPC .................. 455/435–436, 456.1–456.6, 432.1
See application file for complete search history.

(56) References Cited

U.S. PATENT DOCUMENTS

| | | | |
|---|---|---|---|
| 5,983,107 A | 11/1999 | Hayashi | |
| 6,370,380 B1 * | 4/2002 | Norefors et al. | ............... 455/436 |
| 6,414,635 B1 | 7/2002 | Stewart | |

(Continued)

FOREIGN PATENT DOCUMENTS

| | | |
|---|---|---|
| WO | WO9627996 | 9/1996 |
| WO | WO9838819 A2 | 9/1998 |

(Continued)

OTHER PUBLICATIONS

Office Action for European Application No. 05 823 158.0, dated Jul. 6, 2010.

*Primary Examiner* — Michael T Vu
(74) *Attorney, Agent, or Firm* — AlbertDhand LLP

(57) ABSTRACT

A method, computer code product for limiting a wireless communication device to a specified geographic zone. The device is configured to connect to a subscriber device in a subscriber network and determine if the subscriber device is on a list of preapproved subscriber devices in the specified geographic zone. The device can also be configured to determine if it is connected to a subscriber device on at least one neighbor list of approved subscriber devices. If the device is connected to a subscriber device on the preapproved list or a neighbor list, the device is permission as if it is in the geographic zone. Additional subscriber devices can be added to the neighbor list(s) when the device is handed off from an approved subscriber device based on the previous subscriber device to which the device was connected.

9 Claims, 5 Drawing Sheets

(56) References Cited

U.S. PATENT DOCUMENTS

| | | |
|---|---|---|
| 7,684,798 B2 * | 3/2010 | Sengodan et al. ............ 455/436 |
| 2003/0008612 A1 | 1/2003 | Andreason |
| 2003/0040313 A1 * | 2/2003 | Hogan et al. .................. 455/435 |
| 2003/0040314 A1 | 2/2003 | Hogan |
| 2003/0058808 A1 | 3/2003 | Eaton |
| 2003/0206112 A1 | 11/2003 | Harris |
| 2004/0014423 A1 | 1/2004 | Croome |
| 2004/0203923 A1 | 10/2004 | Mullen |
| 2006/0009239 A1 | 1/2006 | Ogren |
| 2006/0046746 A1 | 3/2006 | Ranford |
| 2007/0054665 A1 * | 3/2007 | Elkarat et al. .............. 455/432.1 |

FOREIGN PATENT DOCUMENTS

| | | |
|---|---|---|
| WO | WO9839940 A2 | 9/1998 |
| WO | WO0018156 A1 | 3/2000 |

* cited by examiner

SYSTEM AND METHOD FOR LIMITING A WIRELESS COMMUNICATION DEVICE TO A SPECIFIED GEOGRAPHIC ZONE

The present application is a continuation of U.S. patent application Ser. No. 11/250,979, filed on Oct. 14, 2005, which claims priority to U.S. Provisional Patent Application No. 60/619,016, filed Oct. 14, 2004, both of which are incorporated herein by reference in its entirety.

FIELD OF THE INVENTION

The present invention relates generally to the field of wireless communications devices. More specifically, the present invention relates to systems and methods for permissioning a wireless communication device to operate in a home zone.

BACKGROUND INFORMATION

Tradition wireless communication devices are typically mobile devices configured to search for and communicate with a wireless communication network nearest the current location of the device. As the device moves from one location to another, it is handed off from one cell site within the network to another in order to provide continuous service to the device as it moves out of range of one site and into range of another site.

Fixed wireless is an emerging wireless communication system in which subscribers are provided with wireless communication as their primary communication means in a residence, business, or other defined location. Fixed wireless can be particularly useful in areas where wire services are not available, inadequate or cost prohibitive. In a fixed wireless system, a subscriber's wireless device is typically assigned to a geographically defined home zone. In this type of system, it can become important to control whether and under which circumstances the subscriber is allowed to use the device outside the home zone.

Various methods have been proposed for determining whether a wireless device is operating within its home zone. For example, methods have been proposed in which the wireless device provides the wireless network with its home zone identifier and the network then determines whether to allow the wireless device to connect to the network. Other methods include having the wireless device search for all of the cell sites within range of the device and use information about the detected cell sites to determine if the device is within its home zone. In still other methods, geographic location systems, such as GPS, are employed by the wireless device to determine its location and the location is compared to a digital map stored in the memory of the device in order to determine if the device is within its home zone.

However, these methods tend to be cumbersome and require significant time and resources to implement. Furthermore, wireless networks tend to change over time as cell sites are added or taken out of service. It can be difficult and time consuming for current systems and methods to maintain and adapt to changes in the wireless network.

Thus, there is a need for an improved system and method for determining whether a wireless communication device is within its home zone. There is also a need for a system and method for accounting for and adapting to changes in a wireless communication network in order to determine when a wireless communication device is within its home zone.

SUMMARY OF THE INVENTION

Embodiments of the invention can include methods and computer code products for limiting a wireless communication device to a specified geographic zone, as well as electronic devices limited to use in a specified geographic zone. In one embodiment, the device can be limited to a specified geographic zone by determining whether the device is connected to a subscriber device on a list of preapproved subscriber devices associated with a specified geographic zone and if so, allowing the device to communicate with the subscriber device based on permissions associated with the specified geographic zone. If the device is not connected to a subscriber device on a list of preapproved subscriber devices, it can be determined whether the device is connected to a subscriber device on at least one neighbor list of approved subscriber devices associated with the specified geographic zone, the at least one neighbor list being based on a previous subscriber device to which the device was connected and if so, allowing the device to communicate with the subscriber device based on permissions associated with the specified geographic zone. If the device is not connected to a subscriber device on the preapproved list or a neighbor list, the device can be permissioned to communicate with the subscriber device based on permissions associated with a geographic zone other than the specified geographic zone. The device can also be permissioned to communicate with a limited number of subscriber devices not on the list of preapproved subscriber devices and not on at least one neighbor list based on the permissions associated with the specified geographic zone. The permissions associated with a geographic zone other than the specified geographic zone can include disabling data service to the device.

In one embodiment, the device can be configured to update the neighbor list(s) based on the subscriber device with which the device was previously connected. Multiple neighbor lists, such as a neighbor 1 list and a neighbor 2 list can be used. The neighbor 1 list can comprise subscriber devices to which the device is handed off from a subscriber device on the list of preapproved subscriber devices. The neighbor 2 list can comprise subscriber devices to which the device is handed off from a subscriber device on the neighbor 1 list.

Other principle features and advantages of the invention will become apparent to those skilled in the art upon review of the following drawings, the detailed description, and the appended claims.

DETAILED DESCRIPTION OF THE PREFERRED EMBODIMENTS

One embodiment of the invention relates to systems, methods, devices, and computer code products for permitting a wireless communication device to execute a zoning algorithm that limits the device's range to a prescribed ("home-zone") region. The system, method, device and computer code product can also be capable of adapting to changes within the vicinity of its home-zone. A zoning algorithm can be incorporated to allow the user to use wireless services that are available based on an initial set of approved cell sites that have been provisioned on the device, such as in a USIM (smart card).

The algorithm can also be configured to gain knowledge of its prescribed home-zone over time. When a surrounding neighbor cell or new cell is detected, the algorithm can ascertain if this is an acceptable cell from which to receive wireless service. The decision to accept wireless service can be based upon the location of the cell from which the device was last receiving service. An adapted list of acceptable cells can be created and maintained. Calls that are detected outside of the prescribed home zone can be excluded unless the device has been provisioned to accept a limited number of these cells. In this manner, the device can adapt to a forever-changing wireless network, without affecting the user's connection to that network.

The algorithm can be designed with the network topology in mind, as well as the feature set of the wireless protocol stack. Embodiments of the invention can allow a carrier (network) to roll out a wireless product and offer services to an end customer in a specified region (home-zone) regardless of on-going network changes. The carrier would not have to upgrade the wireless device when changes in the network topologies occur, since the zoning algorithm in the wireless device can make the appropriate adaptations. The adaptable algorithm with the wireless device provides a considerable cost savings when network changes occur. It also permits the carrier to provide services, such as Internet connectivity, to users who do not have any other means of accessing this type of service or to compete against wired services, such as ADSL.

Figure 1:
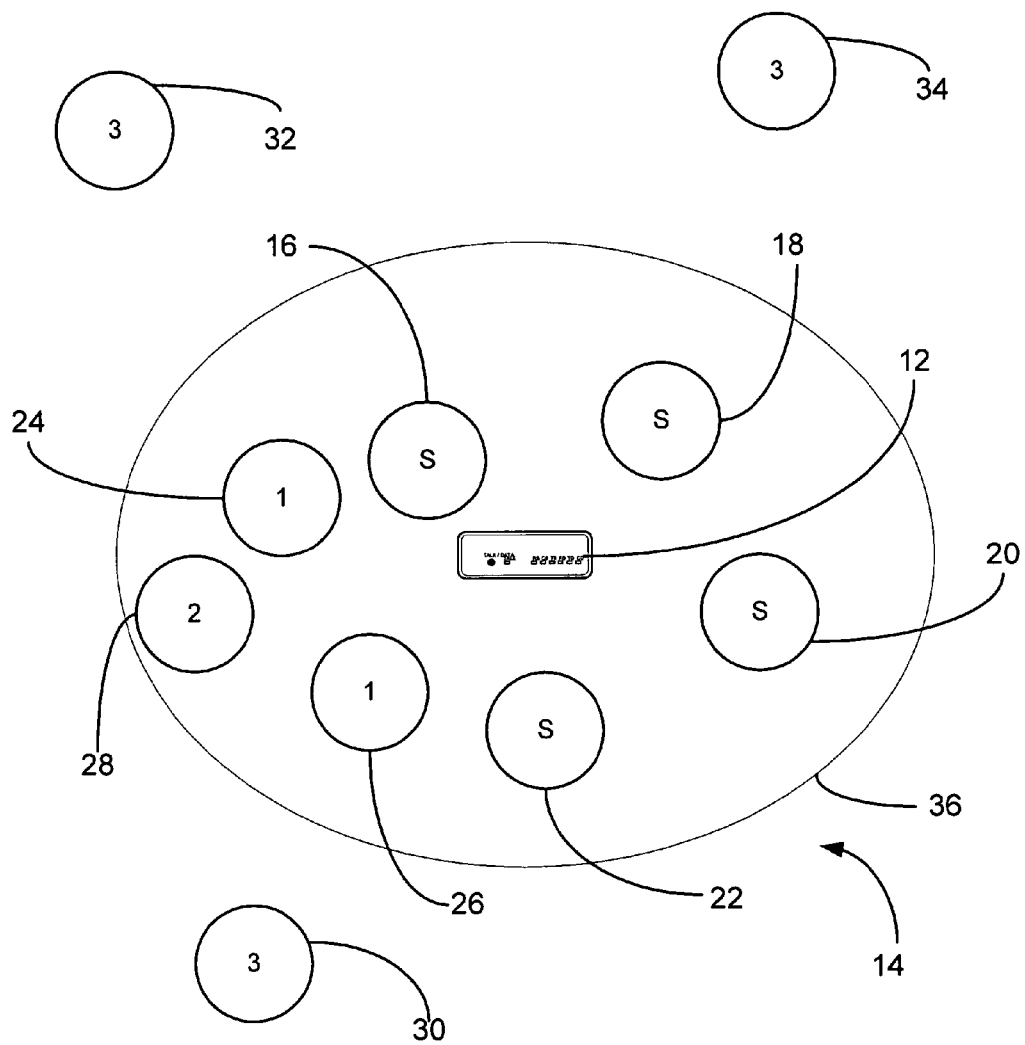
FIG. 1 is a diagrammatical representation of one embodiment of a system according to the present invention.

Referring to FIG. 1, one embodiment of a system according to the present invention is generally designated with reference numeral 10. The system 10 comprises a wireless object 12 and a network 14. The network 14 includes a plurality of network elements 16, 18, 20, 22, 24, 26, 28, 30, 32, and 34, such as cell sites, etc. Each network element 16-34 can be uniquely identified based on information unique to the cell site, such as, for example, the Cell ID# and LAC, the cell scrambling code, the frequency band of operation of the cell, etc.

Some of the network elements 16-28 can be positioned in the geographic home zone 36 of the mobile object 12, while other of the network elements 30, 32 and 34 can be positioned outside the home zone 36. In one embodiment of the invention, the object 12 can be permissioned to communicate with the network elements 16-28 in its home zone 36, but denied permission to communicate with the network elements 30, 32 and 34 outside of its home zone 36.

The object 12 can be configured to establish a connection with a network element in order to receive various communications services from the network 14. Various different permissioning schemes can be used based on whether the object 12 is inside or outside its home zone 36. For example, the object 12 can be allowed to connect to a cell site outside its home zone 36, but be denied data services.

The object 12 can be initially provisioned with a list of approved network elements 16, 18, 20, and 22 predetermined to be in its home zone 36. Additional network elements 24, 26, and 28 inside the home zone 36 can be detected by the object 12 and, once determined to be within the home zone 36, added to other lists of approved network elements. In one embodiment, the number of network elements that can be added to the other lists of approved network elements can be limited to a predetermined number initially provisioned in the object 12. In addition, over the air provisioning (OTAP) can be used to periodically update the list of approved network elements, predetermined limit values, or other information stored in the object 12.

Figure 2:
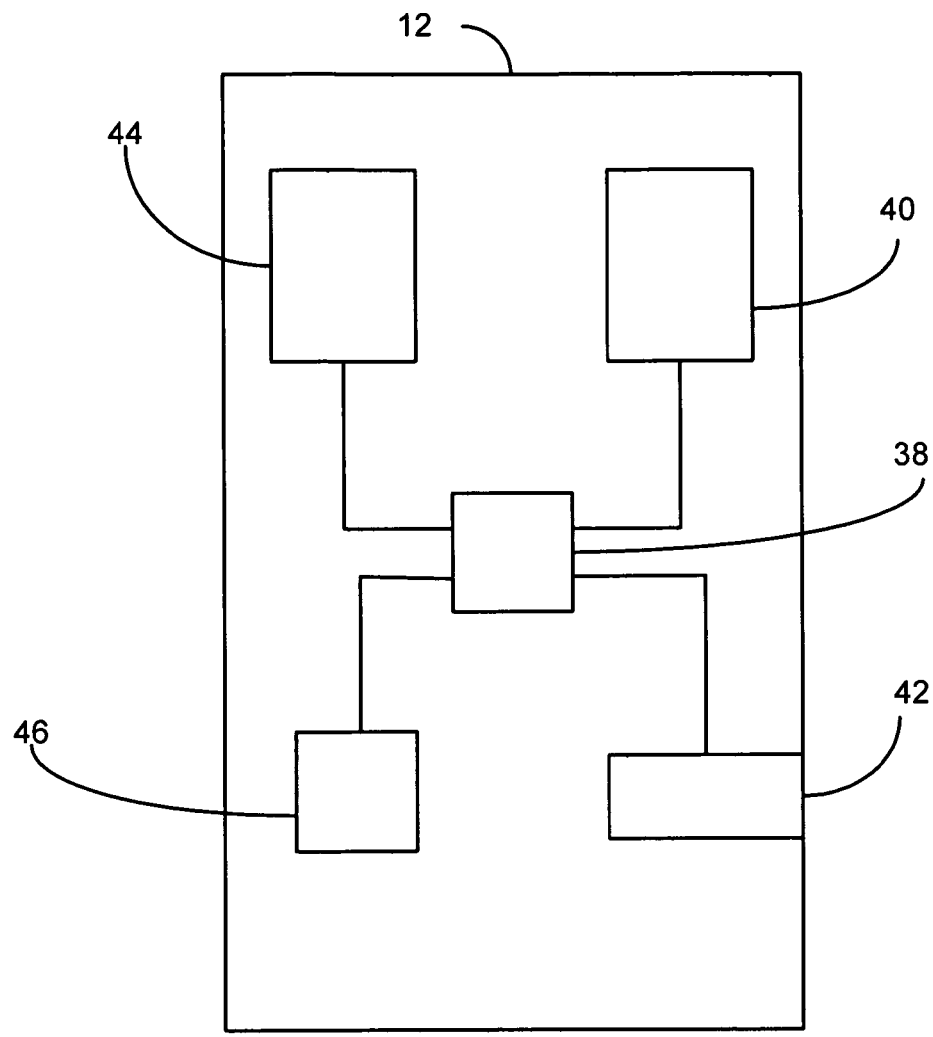
FIG. 2 is a block diagram of one embodiment of a device according to the present invention.

FIG. 2 illustrates one embodiment of a object 12 according to the present invention. The object 12 can include a processor 38, volatile memory 40, non-volatile memory 42, and communications interfaces 44 and 46. In one embodiment, communication interface 44 can be configured to provide WLAN communications services and communication interface 46 can be configured to communicate with a UMTS communication network. The processor 38 can be configured to control operation of the communication interfaces 44 and 46 as well as volatile memory 40 and non-volatile memory 42. It should be noted however that various types of communication services and/or networks can be used in accordance with principals of the present invention.

The non-volatile memory 42 can be used to store an initial set of preapproved network elements 16, 18, 20 and 22 which can be provisioned on the object 12 as an approved subscriber list. The non-volatile memory 42 can be readable and writable so that the approved subscriber list can be updated such as described below with respect to one embodiment of the invention. The volatile memory 40 can be configured for storing temporary information, such as, for example, information about the previous network element to which the device was connected. Upon power down of the device, the information in volatile memory 40 is discarded.

A set of instructions, such as in a software algorithm, for determining whether a network element is within the predefined home zone and for updating lists of approved network elements can be stored in the non-volatile memory 42. The set of instructions can be loaded into volatile memory 40 upon power up of the object 12 and the processor 38 can execute the instructions to control operation of the object 12.

Figure 3:
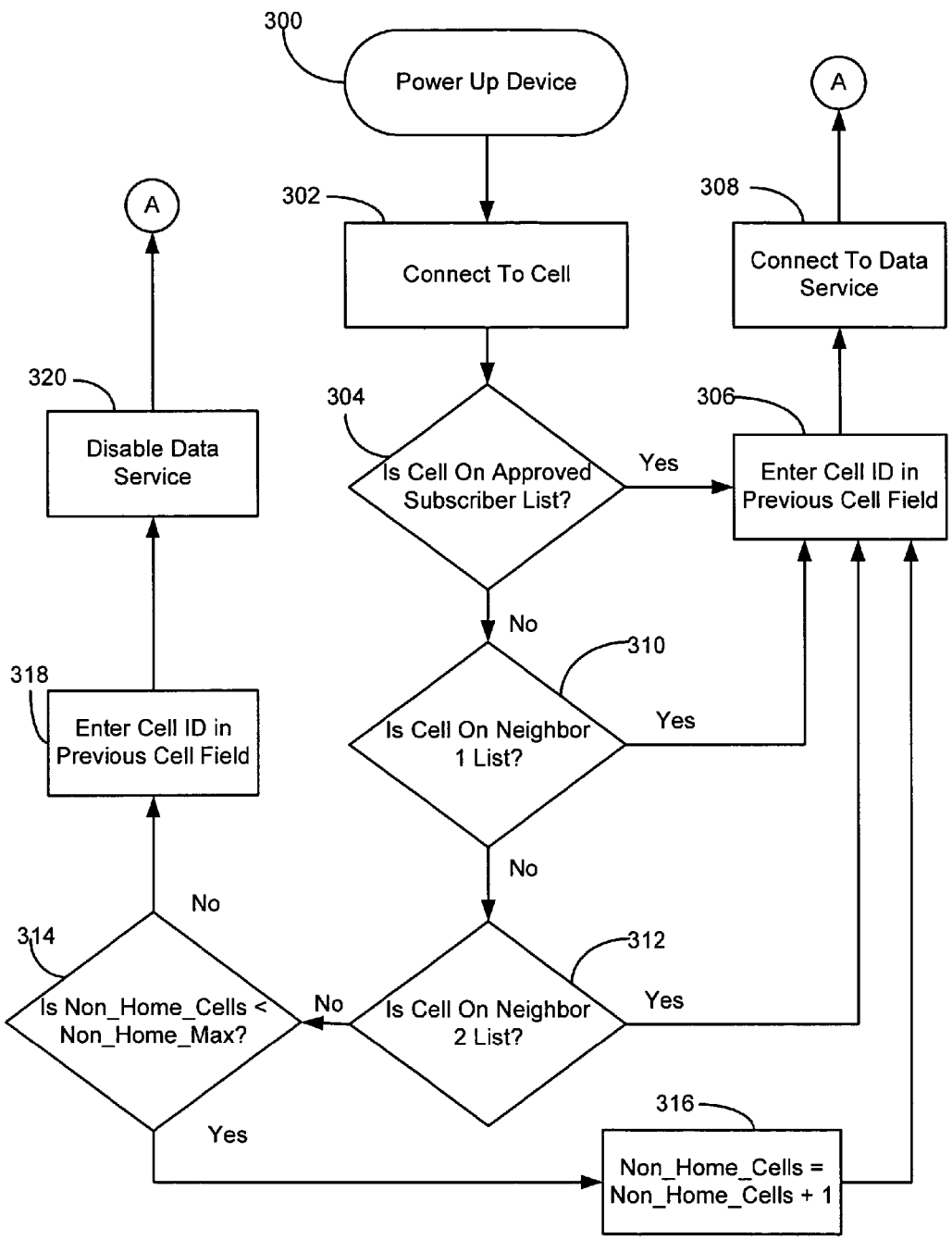
FIG. 3 is a flow chart diagram of one embodiment of a method according to the present invention.

One embodiment of a method according to the present invention is shown in FIG. 3. In this embodiment, the object 12 is provisioned with a list of preapproved cell sites (network elements 16, 18, 20, and 22 in FIG. 1) within its predefined home zone (36 in FIG. 1). Upon power up, in step 300, the object 12 connects to a cell site in step 302. After connecting, the object 12 checks, in step 304, to see if the connected cell is on the preapproved cell site list that has been provisioned on the device such as in non-volatile memory 42. If the connected site is on the preapproved list, the cell ID of the connected site is entered into a previous cell field in memory, such as in volatile memory 40, in step 306 and the object 12 is allowed to connect to data service in step 308.

If the cell ID of the connected site is not on the preapproved list, other lists of approved network elements can be checked. In one embodiment of the invention, other lists of approved network elements can comprise a neighbor 1 list and a neighbor 2 list. A neighbor 1 list can be checked in step 310. As will be explained in more detail below with respect to one embodiment of the invention, the neighbor 1 list comprises cell sites to which object 12 is handed-off from a cell site on the preapproved list. If the cell ID of the connected site is on the neighbor 1 list, the cell ID of the connected site is entered into the previous cell field in memory, such as volatile memory, (step 306) and the device is allowed to connect to data service (step 308).

If the cell ID of the connected site is not on the neighbor 1 list, a neighbor 2 list can be checked in step 312. As will be explained in more detail below with respect to one embodiment of the invention, the neighbor 2 list comprises cell sites to which object 12 is handed-off from a cell site on the neighbor 1 list. If the cell ID of the connected site is on the neighbor 2 list, the cell ID of the connected site is entered into the previous cell field in memory, such as volatile memory 40, (step 306) and the object 12 is allowed to connect to data service (step 308).

If the cell ID of the connected site is not on the neighbor 2 list, the object 12 may still be provisioned to connected to a limited number of "non-home" cells (such as network elements 30, 32, and/or 34 in FIG. 1). In this case, the object 12 can check the non_home_cells variable to determine if it has already connected to the maximum number of provisioned "non home" cells in step 314. If the non_home_cells variable is less than the non_home_max value (which is set to the maximum number of provisioned "non home" cells allowed), the non_home_cells variable can be incremented in step 316, the cell ID of the connected site is entered into the previous cell field in memory (step 306) and the device is allowed to connect to data service (step 308). If the non_home_cells variable is equal to or greater than the non_home_max value, the cell ID can be entered into the previous cell field in step 318 and the data service can be disabled in step 320.

In an alternative embodiment, a non-home cells list of approved network elements can be kept, similar to the neighbor 1 and neighbor 2 lists. In this embodiment, before checking if the object 12 has already connected to the maximum number of provisioned "non-home" cells (step 314), the object 12 can check to see if the connected cell is on the non-home cell list. If it is, the cell ID can be entered into the previous cell field (step 306) and it can be allowed to connect to the data service (step 308). If the cell ID is not already on the non-home cells list, the object 12 can proceed with step 314 and if the non_home_cells variable is less than the non_home_max value, the connected cell can be added to the non-home cells list, the non_home_cells variable can be incremented (step 316), the connected cell ID can be entered into the previous cell field (step 306), and the object 12 can be allowed to connect to data service (step 308).

Figure 4:
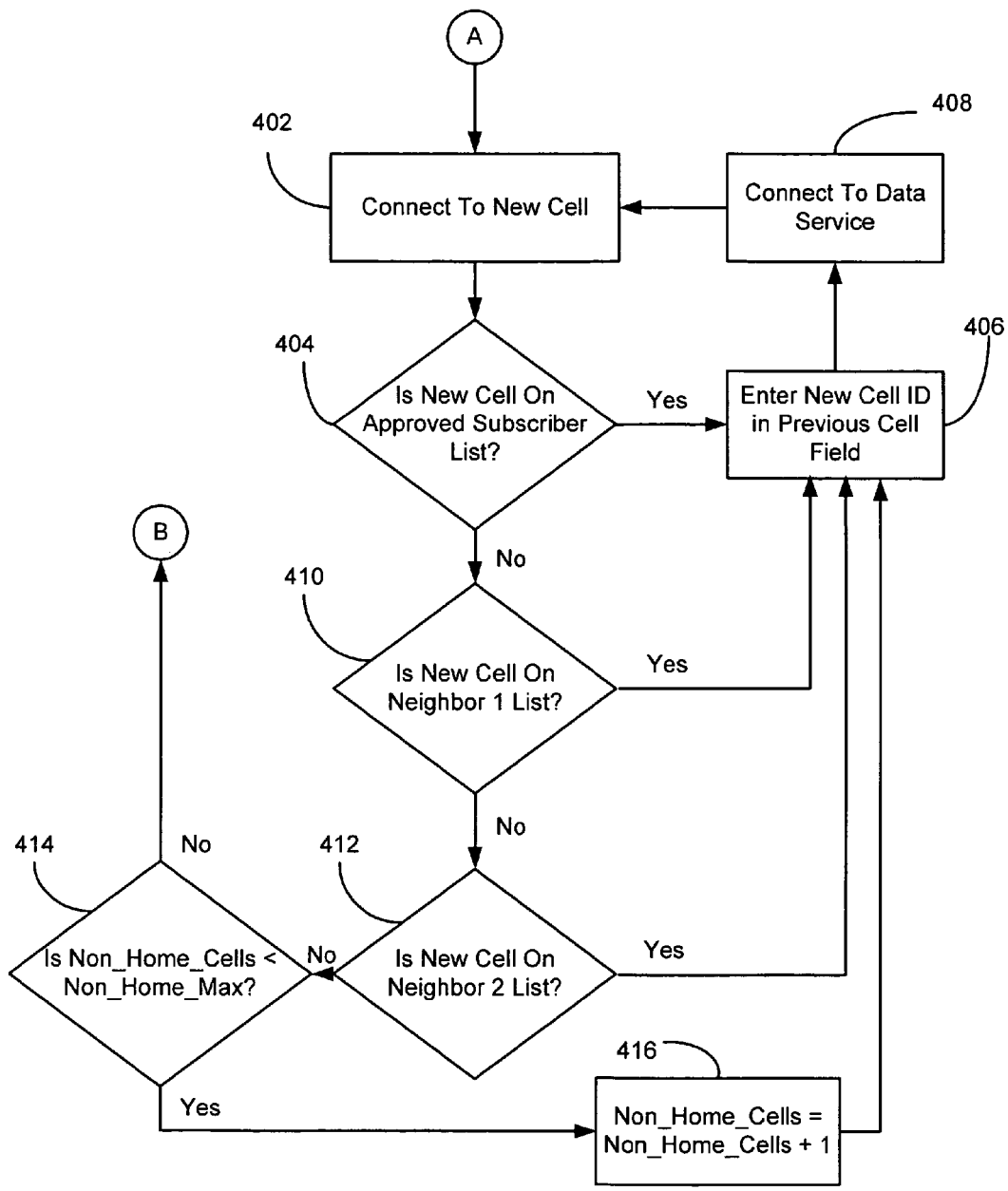
FIG. 4 is a continuation of the flow chart diagram of the method of FIG. 3.

FIG. 4 illustrates another embodiment of the invention. This embodiment addresses the situation of the object 12 being "handed off" from one cell to another. One aspect of the invention can be determining if the object 12 is in its "home zone" after the hand off takes place. In this embodiment, the device connects to a new cell, in step 402, when it is handed off. After connecting to the new cell, the object 12 checks to see if the new cell is on the approved subscriber list in step 404. If it is, the cell ID of the new cell is entered into a previous cell field in memory, such as in volatile memory 40, in step 406 and the object 12 is allowed to connect to data service in step 408. After connecting to the data service, in step 408, the device goes back to the step of waiting to connect to a new cell, step 402, upon hand off.

If the new cell is not on the approved subscriber list, the object 12 checks the neighbor 1 list in step 410. If the new cell is on the neighbor 1 list, the cell ID of the new cell is entered into a previous cell field in memory, such as in volatile memory 40, in step 406 and the object 12 is allowed to connect to data service in step 408. After connecting to the data service, in step 408, the object 12 goes back to the step of waiting to connect to a new cell, step 402, upon hand off.

If the new cell is not on the neighbor 1 list, the object 12 checks the neighbor 2 list in step 412. If the new cell is on the neighbor 2 list, the cell ID of the new cell is entered into a previous cell field in memory, such as in volatile memory 40, in step 406 and the object 12 is allowed to connect to data service in step 408. After connecting to the data service, in step 408, the object 12 goes back to the step of waiting to connect to a new cell, step 402, upon hand off.

If the new cell is not on the neighbor 2 list, the object 12 may still be provisioned to connected to a limited number of "non-home" cells similar to what is described above. In this case, the object 12 can check the non_home_cells variable to determine if it has already connected to the maximum number of provisioned "non_home" cells in step 414. If the non_home_cells variable is less than the non_home_max value (which is set to the maximum number of provisioned "non home" cells allowed), the non_home_cells variable can be incremented in step 416, the cell ID of the connected site is entered into the previous cell field in memory (step 406) and the object 12 is allowed to connect to data service (step 408). If the non_home_cells variable is equal to or greater than the non_home_max value, the object 12 can move on to another process described below with respect to FIG. 5.

In an alternative embodiment, a non-home cells list of approved network elements can be kept, similar to the neighbor 1 and neighbor 2 lists. In this embodiment, before checking if the object 12 has already connected to the maximum number of provisioned "-non-home" cells (step 414), the object 12 can check to see if the connected cell is on the non-home cell list. If it is, the cell ID can be entered into the previous cell field (step 406) and it can be allowed to connect to the data service (step 408). If the cell ID is not already on the non-home cells list, the object 12 can proceed with step 414 and if the non_home_cells variable is less than the non_home_max value, the connected cell can be added to the non-home cells list, the non_home_cells variable can be incremented (step 416), the connected cell ID can be entered into the previous cell field (step 406), and the object 12 can be allowed to connect to data service (step 408).

Figure 5:
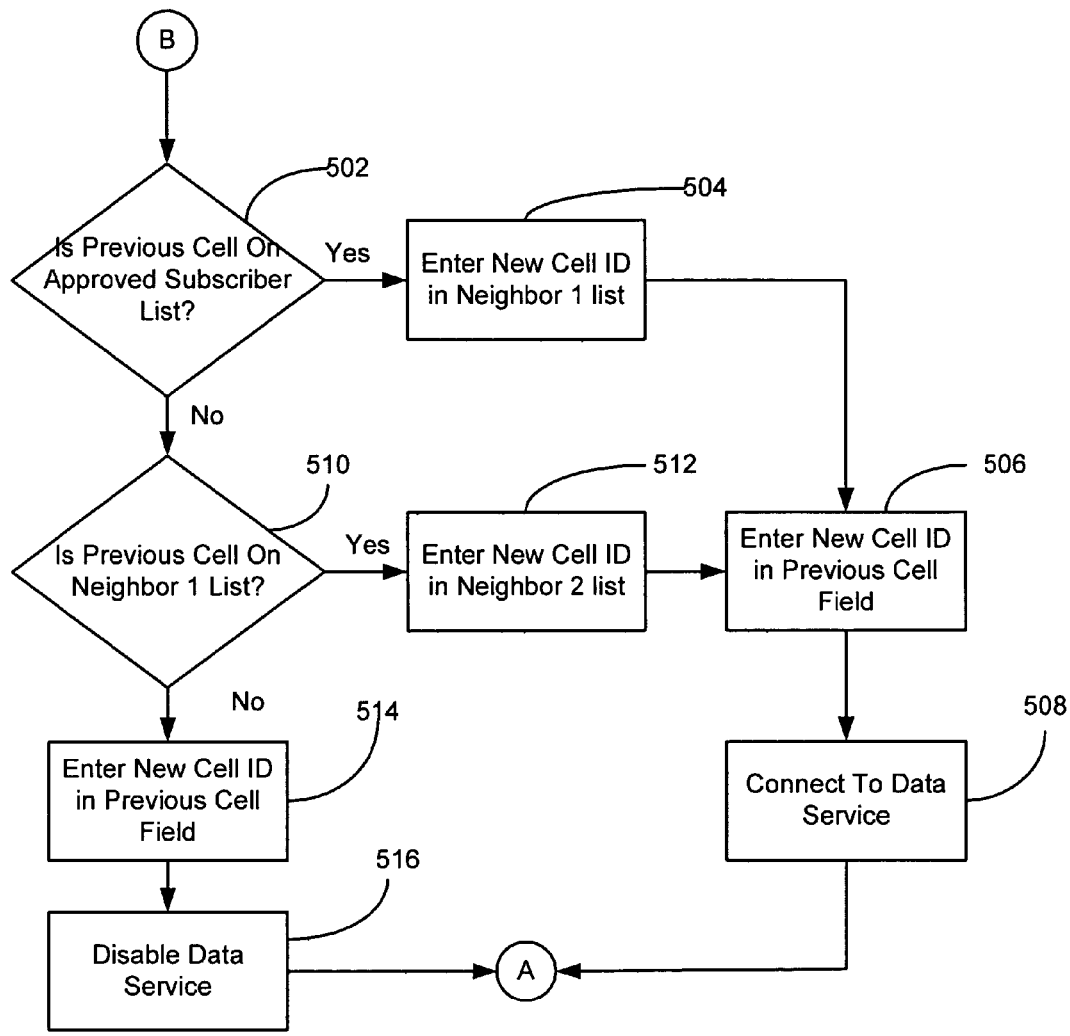
FIG. 5 is a continuation of the flow diagram of the method of FIG. 4.

FIG. 5 illustrates an update process according to one embodiment of the invention. After determining that the device is connected to a new cell site that is not any of the approved lists (preapproved, neighbor 1, neighbor 2, and/or optionally non-home), the object 12 can determine if the new cell should be added to one of the lists. In this case, the object 12 checks to see if the previous cell to which the object 12 was connected is on the approved subscriber list, in step 502. If it is, the new cell ID is added onto the neighbor 1 list, in step 504, the cell ID of the new cell is entered into a previous cell field in memory, such as in volatile memory 40, in step 506 and the object 12 is allowed to connect to data service in step 508. After connecting to the data service, in step 508, the object 12 goes back to the step of waiting to connect to a new cell, step 402, upon hand off.

If the previous cell is not on the approved subscriber list, the object 12 checks to see if it is on the neighbor 1 list, in step 510. If it is, the new cell ID is added onto the neighbor 2 list, in step 512, the cell ID of the new cell is entered into a previous cell field in memory, in step 506, and the object 12 is allowed to connect to data service in step 508. After connecting to the data service, in step 508, the object 12 goes back to the step of waiting to connect to a new cell, step 402, upon hand off.

If the previous cell is not on the neighbor 1 list, the cell ID of the new cell is entered into a previous cell field in memory, in step 514 and data service to the object 12 is disabled in step 516. After disabling data service to the object 12, the object 12 goes back to the step of waiting to connect to a new cell, step 402, upon hand off. Examples of possible "pre-approved" network elements can include elements 16, 18, 20 and 22 in FIG. 1. Examples of possible neighbor 1 network elements can include elements 24 and 26 in FIG. 1. Examples of possible neighbor 2 network elements can include element 28 in FIG. 1. Examples of non-home network elements can include elements 30, 32, and 34 in FIG. 1.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations.

What is claimed is:

1. A method for maintaining a set of approved acceptable network devices located in a prescribed home zone, the method comprising:

initially provisioning a wireless device with a set of approved acceptable network devices located in the prescribed home zone;

detecting at least one additional network device;

determining whether the at least one additional detected network device is an acceptable network device, wherein the decision whether the at least one additional detected network device is an acceptable network device is based upon the network device from which the wireless device was last receiving service; and adding the at least one additional detected network device deemed acceptable to the set of approved acceptable network devices located in the prescribed home zone, wherein, if the network device from which the wireless device was last receiving service is part of the initially provisioned set of approved acceptable network devices, the additional detected network device is deemed acceptable and added as a neighbor 1 device in the set of approved acceptable network devices.

2. The method of claim 1, wherein if the network device from which the wireless device was last receiving service is a neighbor 1 device, the additional detected network device is deemed acceptable and added as a neighbor 2 device in the set of approved acceptable network devices.

3. The method of claim 1, further comprising updating the initially provisioned set of approved acceptable network devices located in the prescribed home zone using over the air provisioning.

4. A method for maintaining a set of approved acceptable network devices located in a prescribed home zone, the method comprising:

initially provisioning a wireless device with a set of approved acceptable network devices located in the prescribed home zone;

wirelessly connecting the wireless device to one of the approved acceptable network devices;

connecting the wireless device to an additional network device;

recording the network device from which the wireless device was last connected;

determining whether the additional network device is an acceptable network device based upon the recorded network device from which the wireless device was last connected; and adding the additional network device deemed acceptable to the set of approved acceptable network devices located in the prescribed home zone, wherein, if the recorded network device from which the wireless device was last receiving service is part of the initially provisioned set of approved acceptable network devices, the additional network device is deemed acceptable and added as a neighbor 1 device in the set of approved acceptable network devices.

5. The method of claim 4, wherein if the recorded network device from which the wireless device was last receiving service is a neighbor 1 device, the additional network device is deemed acceptable and added as a neighbor 2 device in the set of approved acceptable network devices.

6. The method of claim 4, further comprising updating the initially provisioned set of approved acceptable network devices located in the prescribed home zone using over the air provisioning.

7. A wireless device for maintaining a set of approved acceptable network devices located in a prescribed home zone, the device comprising:

a communications interface configured for wirelessly connecting the wireless device to a network device;

memory initially provisioned with a set of approved acceptable network devices located in the prescribed home zone;

a processor for determining whether the network device wirelessly connected to the wireless device is included in the set of approved acceptable network devices located in the prescribed home zone;

if it is determined that the network device wirelessly connected to the wireless device is not included in the set of approved acceptable network devices, the processor determines whether the network device wirelessly connected to the wireless device is in the home zone based upon the network device from which the wireless device was last receiving service; and if it determined that the network device wirelessly connected to the wireless device is not included in the set of approved acceptable network devices but is in the home zone, the network device wirelessly connected to the wireless device is deemed acceptable and added to the set of approved acceptable network devices located in the prescribed home zone, wherein, if the network device from which the wireless device was last receiving service is part of the initially provisioned set of approved acceptable network devices, than the network device wirelessly connected to the wireless device is deemed acceptable and added as a neighbor 1 device in the set of approved acceptable network devices.

8. The device of claim 7, wherein if the network device from which the wireless device was last receiving service is a neighbor 1 device, than the network device wirelessly connected to the wireless device is deemed acceptable and added as a neighbor 2 device in the set of approved acceptable network devices.

9. The device of claim 7, further comprising updating the initially provisioned set of approved acceptable network devices located in the prescribed home zone using over the air provisioning.

* * * * *